(12) United States Patent
Syu et al.

(10) Patent No.: US 9,229,606 B2
(45) Date of Patent: Jan. 5, 2016

(54) SYSTEM AND METHOD FOR RENDERING WIDGET

(71) Applicant: Accton Technology Corporation, Hsinchu (TW)

(72) Inventors: Wei-Hao Syu, Taipei (TW); Yi-Hsiu Cheng, Taipei (TW); En-Yu Wu, Taipei (TW); Yuan-Li Hsu, Taichung (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 233 days.

(21) Appl. No.: 14/024,349

(22) Filed: Sep. 11, 2013

(65) Prior Publication Data

US 2014/0108970 A1 Apr. 17, 2014

(30) Foreign Application Priority Data

Oct. 16, 2012 (TW) ............................. 101138026 A

(51) Int. Cl.
*G06F 3/00* (2006.01)
*G06F 3/048* (2013.01)
*G09G 5/14* (2006.01)

(52) U.S. Cl.
CPC *G06F 3/048* (2013.01); *G09G 5/14* (2013.01); *G09G 2340/04* (2013.01); *G09G 2340/14* (2013.01); *G09G 2354/00* (2013.01); *G09G 2370/042* (2013.01)

(58) Field of Classification Search
CPC ....................................................... G06F 3/048
USPC .......................................................... 715/760
See application file for complete search history.

(56) References Cited

U.S. PATENT DOCUMENTS

| | | | | |
|---|---|---|---|---|
| 6,983,424 | B1* | 1/2006 | Dutta | G06F 3/04817 715/790 |
| 2009/0144651 | A1* | 6/2009 | Sprang | G11B 27/034 715/800 |
| 2009/0199128 | A1* | 8/2009 | Matthews | G06F 3/0481 715/799 |
| 2009/0281901 | A1* | 11/2009 | Lin | G06Q 30/02 705/14.64 |
| 2010/0050130 | A1* | 2/2010 | Farn | G06F 8/38 715/853 |
| 2010/0058230 | A1* | 3/2010 | Shing | G06F 9/4443 715/788 |
| 2010/0275152 | A1* | 10/2010 | Atkins | G06F 17/212 715/788 |
| 2010/0281357 | A1* | 11/2010 | Fu | G06F 9/4445 715/234 |
| 2010/0332995 | A1* | 12/2010 | Chen | G06F 17/30867 715/745 |
| 2010/0333145 | A1* | 12/2010 | Chen | G06F 9/542 725/61 |
| 2011/0037896 | A1* | 2/2011 | Lin | G06F 3/14 348/564 |

(Continued)

FOREIGN PATENT DOCUMENTS

TW 542998 B 7/2003
TW 200519724 A 6/2005

(Continued)

*Primary Examiner* — William Titcomb
(74) *Attorney, Agent, or Firm* — Birch Stewart Kolasch & Birch, LLP

(57) ABSTRACT

A method and a system for rendering a widget are provided. The method is used in an electronic device and includes: receiving a display size of a display unit; comparing the display size of the display unit with a lookup table and obtaining the display size of the widget and a user interface; determining whether the display size of the display unit needs to be adjusted to the display size of the widget; re-adjusting the display size of the display to the display size of the widget according to the obtained display size of the widget when determining that the display size of the display unit needs to be adjusted to the display size of the widget; and rendering the widget.

20 Claims, 4 Drawing Sheets

(56) References Cited

U.S. PATENT DOCUMENTS

| | | | |
|---|---|---|---|
| 2011/0214078 A1* | 9/2011 | Klask | G06F 8/38 715/763 |
| 2012/0081356 A1* | 4/2012 | Filippov et al. | G06T 19/20 345/419 |
| 2012/0081390 A1* | 4/2012 | Cui | G06F 17/30905 345/619 |
| 2012/0250039 A1* | 10/2012 | Ollivierre et al. | G06F 17/30994 358/1.6 |
| 2014/0101573 A1* | 4/2014 | Kuo | G06F 17/30905 715/760 |

FOREIGN PATENT DOCUMENTS

| | | |
|---|---|---|
| TW | 200945879 A | 11/2009 |
| TW | 201009687 A | 3/2010 |

\* cited by examiner

SYSTEM AND METHOD FOR RENDERING WIDGET

CROSS REFERENCE TO RELATED APPLICATIONS

This Application claims priority of Taiwan Patent Application No. 101138026, filed on Oct. 16, 2012, the entirety of which is incorporated by reference herein.

BACKGROUND OF THE INVENTION

1. Field of the Invention

The invention relates to a method and a system for rendering a widget, and more particularly, to a method and a system which can adjust the display size of the widget automatically.

2. Description of the Related Art

As well known, computer systems (e.g., personal computers, laptops, handheld computing devices, cellular phones) allow users to perform tasks or enjoy services by using one or more various types of computer applications. For example, commonly used and prominent computer applications relate to word processing, electronic mail services, portable document viewing and editing, spreadsheets, graphics packages, and Internet browsers. Such applications, referred to herein as "mainstream applications", are generally commercial in nature and complexly coded by teams of developers over relatively long periods of time.

One type of mainstream application that has become almost universal among computer systems is the Internet browser (e.g., Internet Explorer® by Microsoft Corporation, Safari™ by Apple Computer, Inc., Blazer® by Palm, Inc., Firefox® by Mozilla Corporation, Opera™ by Opera Software ASA). As the number of computer systems having access to the Internet continues to grow, users are becoming increasingly accustomed to the availability of real-time information accessible via Internet browsers. Those skilled in the art will recognize that the amount of real-time information available on the Internet is virtually boundless. For example, using their Internet browser, a user can retrieve real-time weather information, news, stock prices, sports scores, and traffic conditions.

Using a mainstream Internet browser application to access information on the Internet generally requires the user to open up the Internet browser, search for or enter an address of a website, wait for the website to load, and then click on links or otherwise navigate through the website for the desired information. In an effort to streamline this process, mini-applications have been made available to allow a user to see real-time Internet-based information on his/her "desktop". Such mini-applications have become to be known in the art as "widgets".

Widgets are generally created by developers. The web page with the widgets created by the developers may be applied to the devices having different display sizes. In general, the widget only has one size. Even if a variety of sizes of the widget are provided, the size of the widget cannot be adjusted or changed. FIGS. 1A~1B are schematic diagrams of the web pages with the same widget in different devices. As shown in FIGS. 1A~1B, the device 10 and the device 12 with different display sizes both display the same web page. However, the content of the widget 100 rendered by the device 10 and the content of the widget 120 rendered by the device 12 are the same. Even if the display size of the device 10 is larger than the display size of the device 12, the display size of the widget 100 of the device 10 cannot be adjusted to render more content.

Therefore, there is a need for a method and a system for rendering a widget that can adjust the display size and the display content of the widget automatically to correspond with the display size of the display rendering the widget.

BRIEF SUMMARY OF THE INVENTION

A detailed description is given in the following embodiments with reference to the accompanying drawings.

A method, a system, a non-transitory computer-readable medium and an electronic device for rendering a widget are provided.

In one exemplary embodiment, the disclosure is directed to a method for rendering a widget, used in an electronic device, the method comprising following steps: receiving a display size of a display unit; comparing the display size of the display unit with a lookup table and obtaining the display size of the widget and a user interface; determining whether the display size of the display unit needs to be adjusted to the display size of the widget; readjusting the display size of the display unit to the display size of the widget according to the obtained display size of the widget when determining that the display size of the display unit needs to be adjusted to the display size of the widget; and rendering the widget.

In one exemplary embodiment, the disclosure is directed to a system for rendering a widget, wherein the widget includes a plurality of widget components. The system comprises a render engine, and a display, wherein the render engine is coupled to the display. The display unit is configured to render the widget. The render engine comprises a receiving module, an analysis module, a determining module and a rendering module. The receiving module receives a display size of the display unit. The analysis module compares the display size of the display unit with a lookup table, and obtains the display size of the widget and a user interface. The determining module determines whether the display size of the display unit needs to be adjusted to the display size of the widget. The rendering module re-adjusts the display size of the display unit to the display size of the widget according to the obtained display size of the widget when determining that the display size of the display unit needs to be adjusted to the display size of the widget.

In one exemplary embodiment, the disclosure is directed to a non-transitory computer-readable medium comprising a computer program, used to execute a method for rendering a widget, and the method comprises following steps: receiving a display size of a display unit; comparing the display size of the display unit with a lookup table, and obtaining the display size of the widget and a user interface; determining whether the display size of the display unit needs to be adjusted to the display size of the widget; re-adjusting the display size of the display unit to the display size of the widget according to the obtained display size of the widget when determining that the display size of the display unit needs to be adjusted to the display size of the widget; and rendering the widget.

In one exemplary embodiment, the disclosure is directed to an electronic device for rendering a widget, wherein the widget includes a plurality of widget components. The electronic device comprises a render engine, and a display unit, wherein the render engine is coupled to the display unit. The display unit is configured to render the widget. The render engine comprises a receiving module, an analysis module, a determining module and a rendering module. The receiving module receives a display size of the display unit. The analysis module compares the display size of the display unit with a lookup table, and obtains the display size of the widget and a user interface. The determining module determines whether the display size of the display unit needs to be adjusted to the display size of the widget. The rendering module re-adjusts the display size of the display unit to the display size of the widget according to the obtained display size of the widget when determining that the display size of the display unit needs to be adjusted to the display size of the widget.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1B:
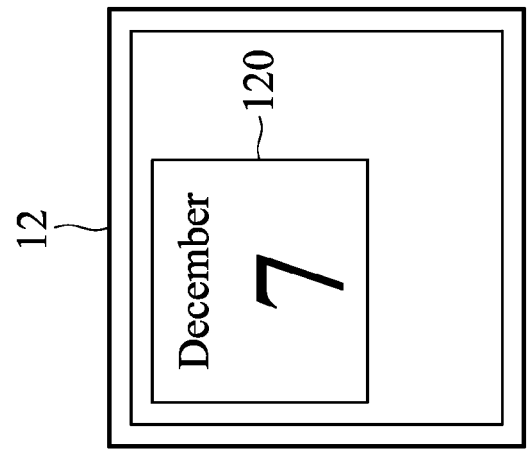
FIGS. 1A~1B are schematic diagrams of web pages with the same widget in different devices.
Figure 1A:
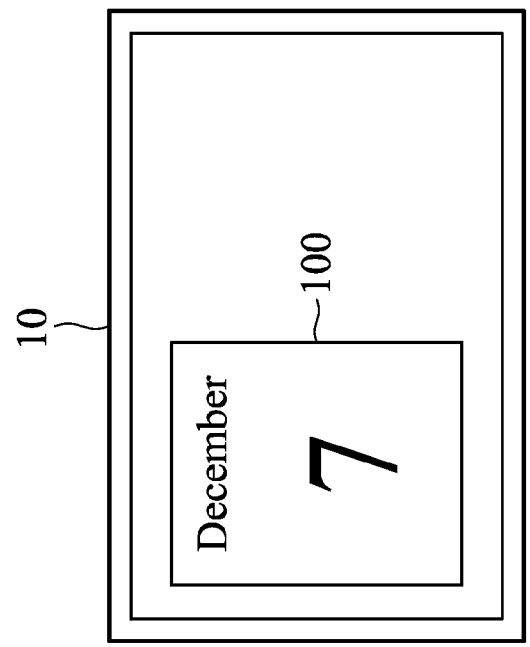

Several exemplary embodiments of the application are described with reference to FIGS. 2 through 4B, which generally relate to a method and a system for rendering a widget. It is understood that the following disclosure provides various different embodiments as examples for implementing different features of the application. Specific examples of components and arrangements are described in the following to simplify the present disclosure. These are, of course, merely examples and are not intended to be limited. In addition, the present disclosure may repeat reference numerals and/or letters in the various examples. This repetition is for the purpose of simplicity and clarity and does not in itself dictate a relationship between the various described embodiments and/or configurations.

Figure 2:
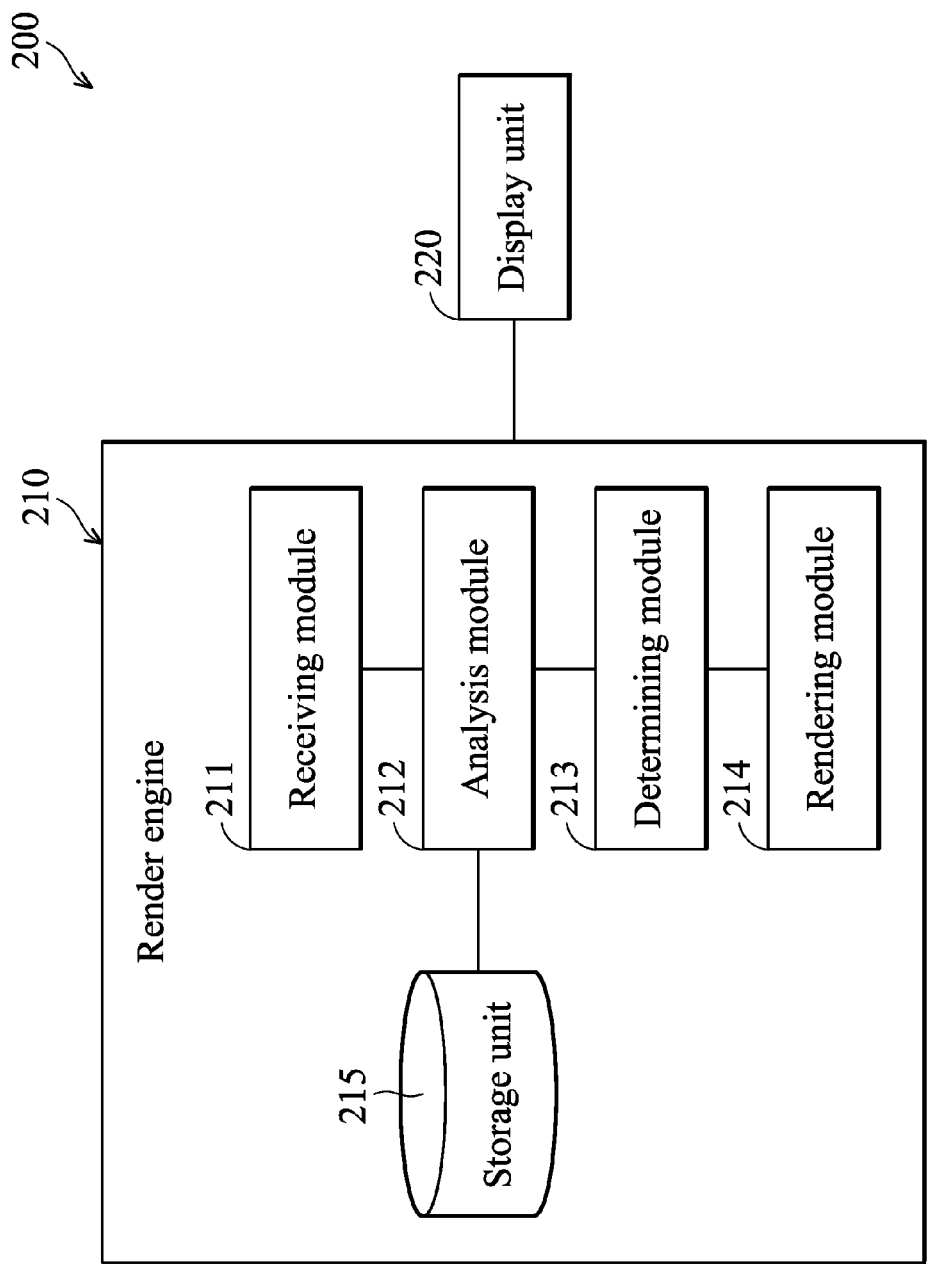
FIG. 2 is a schematic diagram of a system for rendering a widget according to an embodiment of the present invention.

FIG. 2 is a schematic diagram of a system 200 for rendering a widget according to an embodiment of the present invention. The system 200 comprises a render engine 210 and a display unit 220. The render engine 210 is coupled to the display unit 220 and comprises a receiving module 211, an analysis module 212, a determining module 213, and a rendering module 214 and a storage unit 215.

The receiving module 211 is configured to receive a display size of the display unit 220. After receiving the display size of the display unit 220, the receiving module 211 transmits the display size of the display unit 220 to the analysis module 212. In the embodiment, the display size of the display unit 220 is a display size of a widget displayed in a web page. In another embodiment, the display size of the display unit 220 is a window size of the web page in the display unit 220.

The analysis module 212 compares the display size of the display unit 220 with a lookup table stored in the storage unit 215 to obtain the display size of the widget and a user interface. The determining module 213 determines whether the display size of the display unit 220 needs to be adjusted to the display size of the widget, and transmits the result to the rendering module 214. In the present embodiment, the determining module 213 compares the obtained display size of the widget corresponding to the display size of the display unit 220 with the current display size of the display unit 220. When the display size of the widget is different from the current display size of the display unit 220, the determining module 213 determines that the current display size of the display unit 220 needs to be adjusted to the display size of the widget. Next, the determining module 213 informs the rendering module 214 of the display size of the widget.

It should be noted that, in the embodiment, the widget includes a plurality of widget components, and the widget can be composed of elements compiled by such as Hypertext Modeling Language (HTML), Cascading Style Sheets (CSS), javascript and/or other syntax components. The rendering module 214 determines the widget components which can be displayed in the widget according to the display size of the widget and the user interface obtained by the analysis module 212, and re-adjusts the display size of the display unit 220 to the display size of the widget. Finally, the display unit 220 renders the widget re-adjusted by the rendering module 214.

In the embodiment, when a display orientation of the display unit 220 is changed or a window size of the web page rendered in the display unit 220 of the electronic device is changed, the receiving module 211 may receive an event signal, wherein the event signal is used to indicate the window size of the web page displayed in display unit 220. After receiving the event signal, the receiving module 211 re-receives the display size of the display unit 220. In another embodiment, when the display orientation of the display unit 220 is changed or the window size of the web page rendered by the display unit 220 of the electronic device is changed, the receiving module 211 may receive an event signal, wherein the event signal is used to indicate the changed display size of the widget displayed in the web page. After receiving the event signal, the receiving module 211 re-receives the display size of the display unit 220 corresponding to the changed display size of the widget.

In addition, the system 200 for rendering a widget according to the embodiment of the present invention can be applied in an electronic device, for example, portable electronic devices, such as personal digital assistants (Personal Digital Assistant, PDA), smart phones, mobile phones, mobile Internet devices, (MID), Netbooks and/or other handheld devices.

Figure 3:
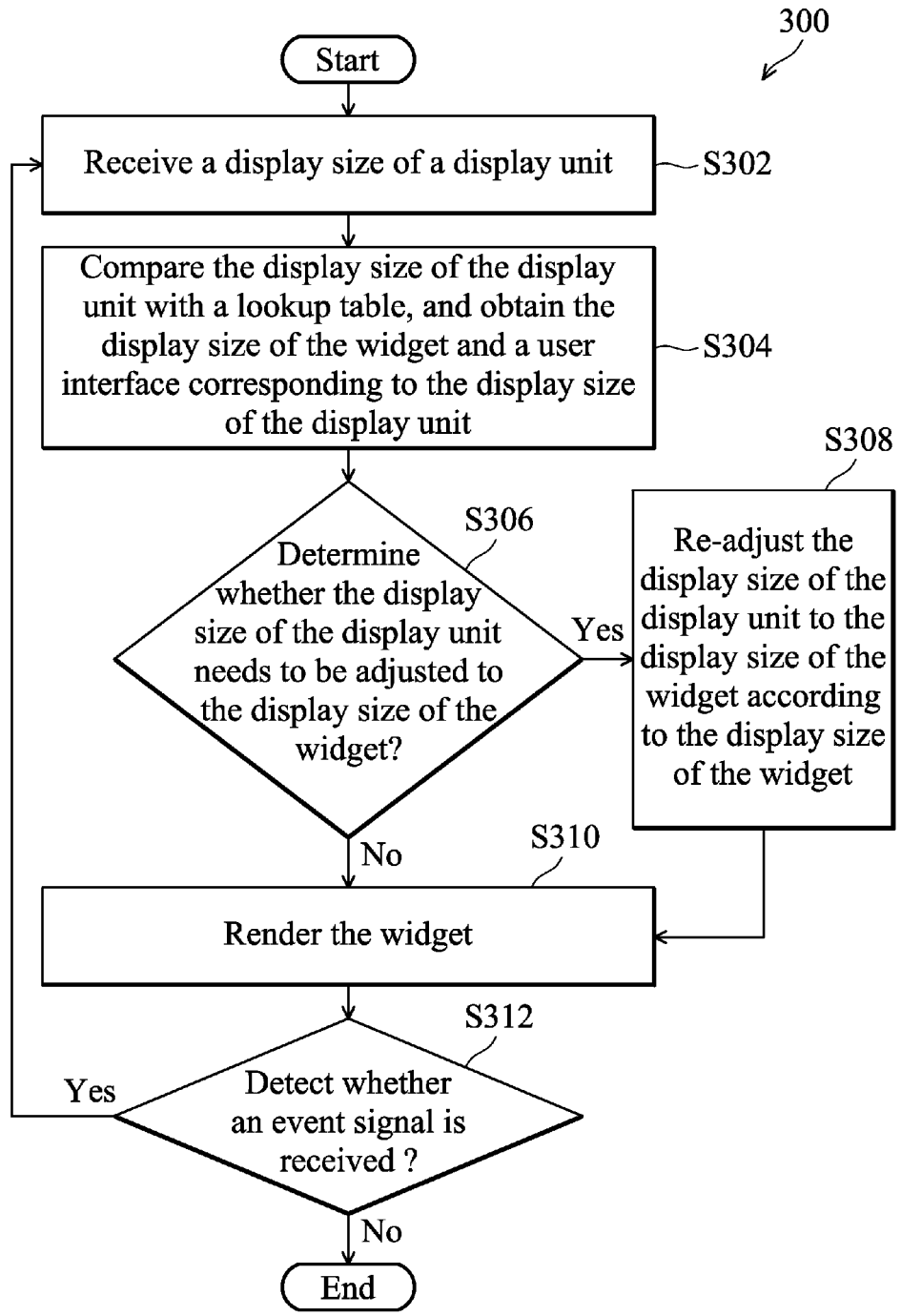
FIG. 3 is a flow diagram illustrating a method for rendering a widget according to an embodiment of the present invention.

FIG. 3 is a flow diagram 300 illustrating a method for rendering a widget according to an embodiment of the present invention with reference to FIG. 2. The method for rendering a widget can be used in an electronic device such as portable electronic devices.

In step S302, a receiving module 211 receives a display size of a display unit 220. In step S304, an analysis module 212 compares the display size of the display unit 220 with a lookup table, and obtains the display size of the widget and a user interface corresponding to the display size of the display unit 220. Then, in step S306, a determining module 213 determines whether the display size of the display unit 220 needs to be adjusted to the display size of the widget. When the determining module 213 determines that the display size of the display unit 220 does not need to be adjusted to the display size of the widget ("No" in step S306), in step S310, the display unit 220 renders the widget. When the determining module 213 determines that the display size of the display unit 220 needs to be adjusted to the display size of the widget ("Yes" in step S306), in step S308, a rendering module 214 re-adjusts the display size of the display unit 220 to the display size of the widget according to the display size of the widget obtained by the analysis module 212. Then, in step S310, the display unit 220 renders the widget. Next, in step S312, the receiving module 211 detects whether an event signal is received, wherein the event signal is used to indicate the display size of the display unit 220 and the window size of the web page when a display orientation of the display unit 220 or a window size of the web page is changed. When the receiving module 211 receives the event signal ("Yes" in step S312), step S302 and the following steps are performed as described in flowchart 300. When the receiving module 211 receives the event signal ("No" in step S312), the process is terminated.

Figure 4B:
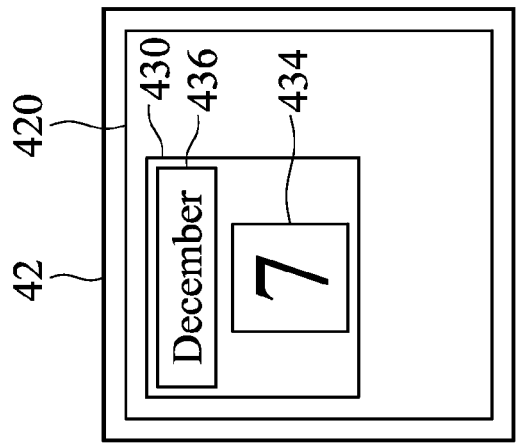
FIGS. 4A~4B are schematic diagrams for rendering a widget according to an embodiment of the present invention.
Figure 4A:
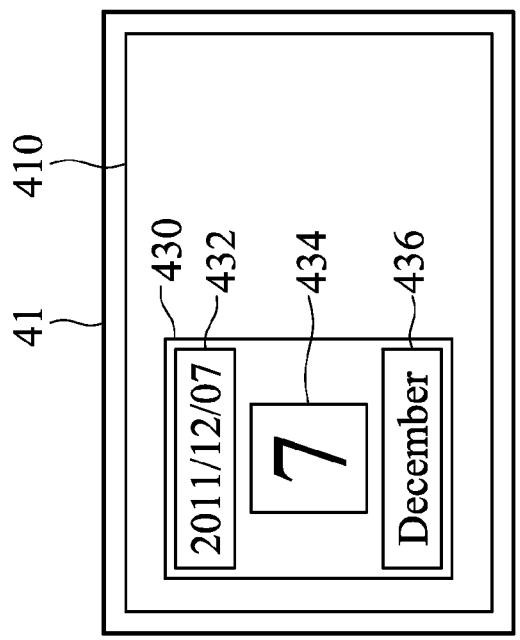

FIGS. 4A~4B are schematic diagrams for rendering a widget according to an embodiment of the present invention. As shown in FIGS. 4A~4B, the electronic device 41 has a display unit 410 and the electronic device 42 has a display unit 420, wherein the display size of the display unit 410 and the display size of the display unit 420 are different, and the electronic device 41 and the electronic device 42 both use the same widget 430.

In FIG. 4A, the widget 430 includes widget components 432, 434 and 436. It must be noted that the number, shapes, and arrangements of the plurality of widget components described above is not limited to the embodiments and the figures shown in this invention.

For example, in FIG. 4A, the widget 430 is a calendar, wherein the widget component 432 is time information (for example, a day, a month, and a year), the widget component 434 is date information, and the widget component 436 is month information. The display size of the display unit 420 of the electronic device 42 in FIG. 4B is different from the display size of the display unit 410 of the electronic device 41 in FIG. 4A, and therefore only the widget component 434 and the widget component 436 is displayed in the widget 430 of the display unit 420 of the electronic device 42 in FIG. 4B.

In another embodiment, the display size of the display and the widget is defined as a display width or a display length, and is defined as pixels.

Specifically, but not limited to such examples, a lookup table is shown in Table 1. The analysis module compares the display size of the display with the lookup table, and obtains a display size of a widget and a user interface. Then, the determining module determines whether the display size of the display needs to be adjusted to the display size of the widget.

TABLE 1

| Widget User Interface | Width of the widget | Range |
|---|---|---|
| User Interface 1 | 140 pixels | The width of the original widget > 100 pixels |
| User Interface 2 | 70 pixels | 100 pixels > The width of the original widget > 50 pixels |
| User Interface 3 | 30 pixels | 50 pixels > The width of the original widget |

As shown in Table 1, different widget widths may correspond to different user interfaces. Therefore, the developers who design the user interfaces can design different widget components with different sizes corresponding to different user interfaces in advance according to the spaces of the different widgets.

For example, in the electronic device 42 of FIG. 4B, the display size of the widget rendered in the display unit 420 is 80 pixels. After the receiving module of the electronic device 42 receives the display size of the display unit 420, the analysis module compares the display size of the display with Table 1 of the lookup table. As shown in Table 1, the display size of the display unit 420 is in the range from 50 to 100 pixels. Therefore, the width of the widget corresponding to the display 420 is 70 pixels, and the user interface applicable to the display 420 is the user interface 2. Then, the determining module 213 determines whether the display width of the display unit 410 needs to be adjusted to the display size of the widget. Thus, the determining module 213 determines that the display width of the display is not equal to the width of the widget corresponding to the display unit 420 which is 70 pixels. Therefore, the rendering module 214 re-adjusts the display width of the display unit 410 to 70 pixels according the obtained width of the widget. In addition, the rendering module 214 further determines that the widget components should be rendered in the widget 430 and the display size of the widget 430 according to the user interface 2.

Therefore, through the method and the system for rendering the widget, the display size of the widget and the content displayed in the widget can be adjusted according to the display sizes of different displays to improve the quality of viewing the widget rendered in the display.

Methods and systems for rendering a widget, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for rendering a widget, used in an electronic device, the method comprising following steps:

receiving a display size of a display unit;

comparing the display size of the display unit with a lookup table, and obtaining the display size of the widget and a user interface;

determining whether the display size of the display unit needs to be adjusted to the display size of the widget;

re-adjusting the display size of the display unit to the display size of the widget according to the obtained display size of the widget when determining that the display size of the display unit needs to be adjusted to the display size of the widget; and rendering the widget.

2. The method for rendering a widget as claimed in claim 1, further comprising following steps:

receiving an event signal when a display orientation of the display unit is changed or a window size of a web page rendered in the display unit is changed, wherein the event signal is used to indicate the display size of the display and the window size of the web page.

3. The method for rendering a widget as claimed in claim 1, further comprising following steps:

storing the lookup table by a storage unit.

4. The method for rendering a widget as claimed in claim 1, wherein the display size is defined as a display width or a display length.

5. The method for rendering a widget as claimed in claim 1, wherein the display size is defined as pixels.

6. A system for rendering a widget, used in an electronic device, wherein the widget includes a plurality of widget components, and the system comprises:

a display unit, configured to render the widget; and a render engine, coupled to the display unit, comprising:

a receiving module, configured to receive a display size of the display unit;

an analysis module, configured to compare the display size of the display unit with a lookup table, and obtain the display size of the widget and a user interface;

a determining module, configured to determine whether the display size of the display unit needs to be adjusted to the display size of the widget; and a rendering module, configured to re-adjust the display size of the display unit to the display size of the widget according to the obtained display size of the widget when determining that the display size of the display unit needs to be adjusted to the display size of the widget.

7. The system for rendering a widget as claimed in claim 6, wherein the receiving module receives an event signal when a display orientation of the display unit is changed or a window size of a web page rendered in the display unit is changed, wherein the event signal is used to indicate the display size of the display unit and the window size of the web page.

8. The system for rendering a widget as claimed in claim 6, further comprising: a storage unit, configured to store the lookup table.

9. The system for rendering a widget as claimed in claim 6, wherein the display size is defined as a display width or a display length.

10. The system for rendering a widget as claimed in claim 6, wherein the display size is defined as pixels.

11. A non-transitory computer-readable medium comprising a computer program, used to execute a method for rendering a widget, the method comprises following steps:

receiving a display size of a display unit;

comparing the display size of the display unit with a lookup table, and obtaining the display size of the widget and a user interface;

determining whether the display size of the display unit needs to be adjusted to the display size of the widget;

re-adjusting the display size of the display unit to the display size of the widget according to the obtained display size of the widget when determining that the display size of the display unit needs to be adjusted to the display size of the widget; and rendering the widget.

12. The non-transitory computer-readable medium as claimed in claim 11, further comprising following steps:

receiving an event signal when a display orientation of the display unit is changed or a window size of a web page rendered in the display unit is changed, wherein the event signal is used to indicate the display size of the display and the window size of the web page.

13. The non-transitory computer-readable medium as claimed in claim 11, further comprising following steps:

storing the lookup table by a storage unit.

14. The non-transitory computer-readable medium as claimed in claim 11, wherein the display size is defined as a display width or a display length.

15. The non-transitory computer-readable medium as claimed in claim 11, wherein the display size is defined as pixels.

16. An electronic device for rendering a widget, wherein the widget includes a plurality of widget components, and the electronic device comprises:

a display unit, configured to render the widget; and a render engine, coupled to the display unit, comprising:

a receiving module, configured to receive a display size of the display unit;

an analysis module, configured to compare the display size of the display unit with a lookup table, and obtain the display size of the widget and a user interface;

a determining module, configured to determine whether the display size of the display unit needs to be adjusted to the display size of the widget; and a rendering module, configured to re-adjust the display size of the display unit to the display size of the widget according to the obtained display size of the widget when determining that the display size of the display unit needs to be adjusted to the display size of the widget.

17. The electronic device for rendering a widget as claimed in claim 16, wherein the receiving module receives an event signal when a display orientation of the display unit is changed or a window size of a web page rendered in the display unit is changed, wherein the event signal is used to indicate the display size of the display unit and the window size of the web page.

18. The electronic device for rendering a widget as claimed in claim 16, further comprising:

a storage unit, configured to store the lookup table.

19. The electronic device for rendering a widget as claimed in claim 16, wherein the display size is defined as a display width or a display length.

20. The electronic device for rendering a widget as claimed in claim 16, wherein the display size is defined as pixels.

* * * * *